(12) United States Patent
Kawamoto (10) Patent No.: US 11,742,739 B2
(45) Date of Patent: *Aug. 29, 2023

(54) GIMMICK DEVICE

(71) Applicant: OMRON Corporation, Kyoto (JP)

(72) Inventor: Ryuji Kawamoto, Ichinomiya (JP)

(73) Assignee: OMRON CORPORATION, Kyoto (JP)

(*) Notice: Subject to any disclaimer, the term of this patent is extended or adjusted under 35 U.S.C. 154(b) by 106 days.

This patent is subject to a terminal disclaimer.

(21) Appl. No.: 17/408,543

(22) Filed: Aug. 23, 2021

(65) Prior Publication Data

US 2022/0103057 A1 Mar. 31, 2022

(30) Foreign Application Priority Data

Sep. 29, 2020 (JP) ................... 2020-163606

(51) Int. Cl.
| | | |
|---|---|---|
| H02K 41/035 | (2006.01) | |
| H02K 7/14 | (2006.01) | |
| H02K 11/33 | (2016.01) | |
| H02K 11/26 | (2016.01) | |
| A63F 7/02 | (2006.01) | |

(52) U.S. Cl.
CPC ......... *H02K 41/0354* (2013.01); *A63F 7/022* (2013.01); *H02K 7/14* (2013.01); *H02K 11/26* (2016.01); *H02K 11/33* (2016.01)

(58) Field of Classification Search
CPC .... H02K 41/0354; H02K 11/26; H02K 11/33; H02K 7/14

USPC ...................... 310/12.16, 12.21, 66
See application file for complete search history.

(56) References Cited

U.S. PATENT DOCUMENTS

| | | | | |
|---|---|---|---|---|
| 7,501,834 | B2* | 3/2009 | Madni ............... | H02K 41/0356 381/400 |
| 2008/0199039 | A1* | 8/2008 | Bohlender ............... | H04R 9/06 381/412 |
| 2020/0413171 | A1* | 12/2020 | Shen ...................... | H04R 9/025 |
| 2022/0103057 | A1* | 3/2022 | Kawamoto ........ | H02K 41/0354 |

FOREIGN PATENT DOCUMENTS

| | | | |
|---|---|---|---|
| JP | 2007275421 A | * | 10/2007 |
| JP | 2017-205302 A | | 11/2017 |

\* cited by examiner

*Primary Examiner* — Jose A Gonzalez Quinones (74) *Attorney, Agent, or Firm* — METROLEX IP LAW GROUP, PLLC (57) ABSTRACT

A gimmick device according to one or more embodiments may include a gimmick and a voice coil motors (VCM). The VCM includes a casing, a permanent magnet, a yoke and iron-core, a bobbin, and a coil part. The gimmick is mounted to the casing on a movable side. The coil part includes a drive and primary coil serving as a drive coil and a primary coil of a displacement sensor including a differential transformer, the drive and primary coil being interlinked with a magnetic flux by the permanent magnet, and two secondary coils of the displacement sensor. The yoke and iron-core may be disposed in a central space defined in the coil part, and serves as an iron core of the displacement sensor.

15 Claims, 8 Drawing Sheets

GIMMICK DEVICE

CROSS-REFERENCE TO RELATED APPLICATION

This application is based on Japanese Patent Application No. 2020-163606 filed with the Japan Patent Office on Sep. 29, 2020, the entire contents of which are incorporated herein by reference.

FIELD

The disclosure relates to a gimmick device to be installed in a game machine.

BACKGROUND

In a game machine, heretofore, a linear movement of a gimmick device has been controlled using a combination of a rotary stepping motor with a rotation-to-linear movement conversion mechanism, such as a rack and pinion or a cam, for converting rotating motion into linearly reciprocating motion (for example, JP 2017-205302 A). Alternatively, a linearly movable voice coil motor (hereinafter, abbreviated as VCM) has been subjected to current control.

However, the configuration using the rotation-to-linear movement conversion mechanism is less likely to achieve a smooth operation due to backlash in the rotation-to-linear movement conversion mechanism. Specifically, in reversing the linearly moving direction, the above-described configuration fails to smoothly reverse the linearly moving direction and consequently fails to achieve smooth motion as if an object is floating, for example. In addition, an influence of a change in ambient temperature or an individual difference of a constituent component may cause a deviation between a target position and an operating position.

In contrast, the configuration using the linearly movable VCM reverses the linearly moving direction more smoothly than the configuration using the rotation-to-linear movement conversion mechanism. Similar to a rotation-to-linear movement conversion mechanism, an influence of a change in ambient temperature or an individual difference of a constituent component may cause a deviation between a target position and an operating position. In particular, the use of a permanent magnet may cause a decrease in magnetic force when a temperature of the permanent magnet increases due to, for example, a rise in ambient temperature or heat generation from a drive coil by energization. Consequently, a displacement amplitude decreases even when the permanent magnet is driven with a current having a constant amplitude.

It should be noted that the deviation between the target position and the operating position is dissolved in such a manner that a displacement sensor is provided to detect the operating position (a displacement), and is controlled to eliminate the deviation between the operating position and the target position. However, such an approach causes enlargement of a drive mechanism that operates a gimmick, and also causes increase in cost.

SUMMARY

A gimmick device according to one or more embodiments may be capable of consistently achieving desired motion of a gimmick without enlargement of a drive mechanism for operating the gimmick or increase in cost.

Accordingly, one or more embodiments may adopt the following configurations.

Specifically, a gimmick device according to one or more embodiments may include a gimmick and a voice coil motor configured to operate the gimmick. The voice coil motor may include: a casing having a bottom end-closed cylindrical shape; a permanent magnet having a cylindrical outer peripheral face, the permanent magnet being disposed on a central bottom portion in the casing; a yoke disposed opposite the permanent magnet in the casing, the yoke being equal in diameter to the permanent magnet; a bobbin; and a coil part wound around the bobbin. The gimmick is mounted to a movable one of the casing or the bobbin. The coil part may include: a drive and primary coil serving as a drive coil and a primary coil of a differential transformer, the drive and primary coil being interlinked with a magnetic flux by the permanent magnet; and two secondary coils of the differential transformer. The yoke is disposed in a central space defined in the coil part, and serves as an iron core of the differential transformer.

According to the above-described configuration, when a drive current is fed to the drive and primary coil, a thrust (Lorentz force) is generated in an axial direction of the drive and primary coil in accordance with Fleming's left-hand rule. As a result, a magnet side including the casing, the permanent magnet, and the yoke and a coil side including the bobbin and the coil part are displaced relatively. In addition, the coil part including the drive and primary coil and the two secondary coils and the yoke disposed in the central space defined in the coil part constitute a displacement sensor including the differential transformer. When the drive and primary coil is driven with an alternating-current power supply, a position of the magnet side relative to the coil side is detected from a difference between voltages induced in the two secondary coils.

According to the above-described configuration, as described above, the coil and the yoke in the voice coil motor serve as the primary coil and the iron core for excitation of the differential transformer for detecting a displacement. The differential transformer for detecting a relative position is thus incorporated in the voice coil motor only by addition of two secondary coils as components.

In the gimmick device according to the foregoing aspect, the two secondary coils may be wound around an outer periphery of the drive and primary coil while being placed on top of the other. According to the above-described configuration, the displacement sensor including the differential transformer is incorporated in the voice coil motor as a drive mechanism without changing an axial size of an outer shape of the voice coil motor.

In the gimmick device according to one or more embodiments, the two secondary coils may be wound around axial two ends of the drive and primary coil. According to the above-described configuration, the displacement sensor including the differential transformer may be incorporated in the voice coil motor as the drive mechanism without changing a radial size of the outer shape of the voice coil motor.

A drive control device according to one or more embodiments is a drive control device for the gimmick device according to the foregoing aspect. The drive control device includes: an oscillator configured to generate a high-frequency current; a drive unit configured to amplify a signal that includes a signal indicating a target position of a movable side in the voice coil motor and the high-frequency current superimposed on the signal, the high-frequency current being generated by the oscillator, and to supply the signal thus amplified to the drive and primary coil; a processing unit configured to receive voltages to be induced in the two secondary coils of the voice coil motor, and to output a position signal indicating a position of the movable side, based on each of the voltages; and a correction unit configured to correct a signal indicating the target position, the signal being input to the drive unit, based on the position signal output from the processing unit.

According to the above-described configuration, the drive unit amplifies the signal that includes the signal indicating the target position of the movable side and the high-frequency current superimposed on the signal, the high-frequency current being generated by the oscillator, and supplies the signal thus amplified to the drive and primary coil. The processing unit outputs the position signal indicating the position of the movable side, based on the voltages induced in the two secondary coils. In other words, the processing unit outputs the position signal indicating the position of the magnet side relative to the coil side. The correction unit corrects the signal indicating the target position, the signal being input to the drive unit, based on the position signal output from the processing unit.

In the drive control device according to the foregoing aspect, the high-frequency current may have a frequency higher than a response frequency of the voice coil motor. With such a configuration, highly accurate position control is achieved since the superimposed high-frequency current causes no displacement of the voice coil motor.

A game machine according to one or more embodiments may include the gimmick device according to the foregoing aspect and the drive control device according to the foregoing aspect.

A gimmick device may be capable of consistently achieving desired motion of a gimmick without enlargement of a drive mechanism for operating the gimmick or increase in cost.

DETAILED DESCRIPTION

With reference to the drawings, hereinafter, a description will be given according to one or more embodiments (hereinafter, also referred to as the "embodiment" or "embodiments"). It should be however noted that the one or more embodiments to be described below are merely exemplary in all respects. As a matter of course, various modifications and variations may be made without departing from the scope. In other words, specific configurations according to one or more embodiments may be appropriately adopted.

1. Application Example

Figure 10:
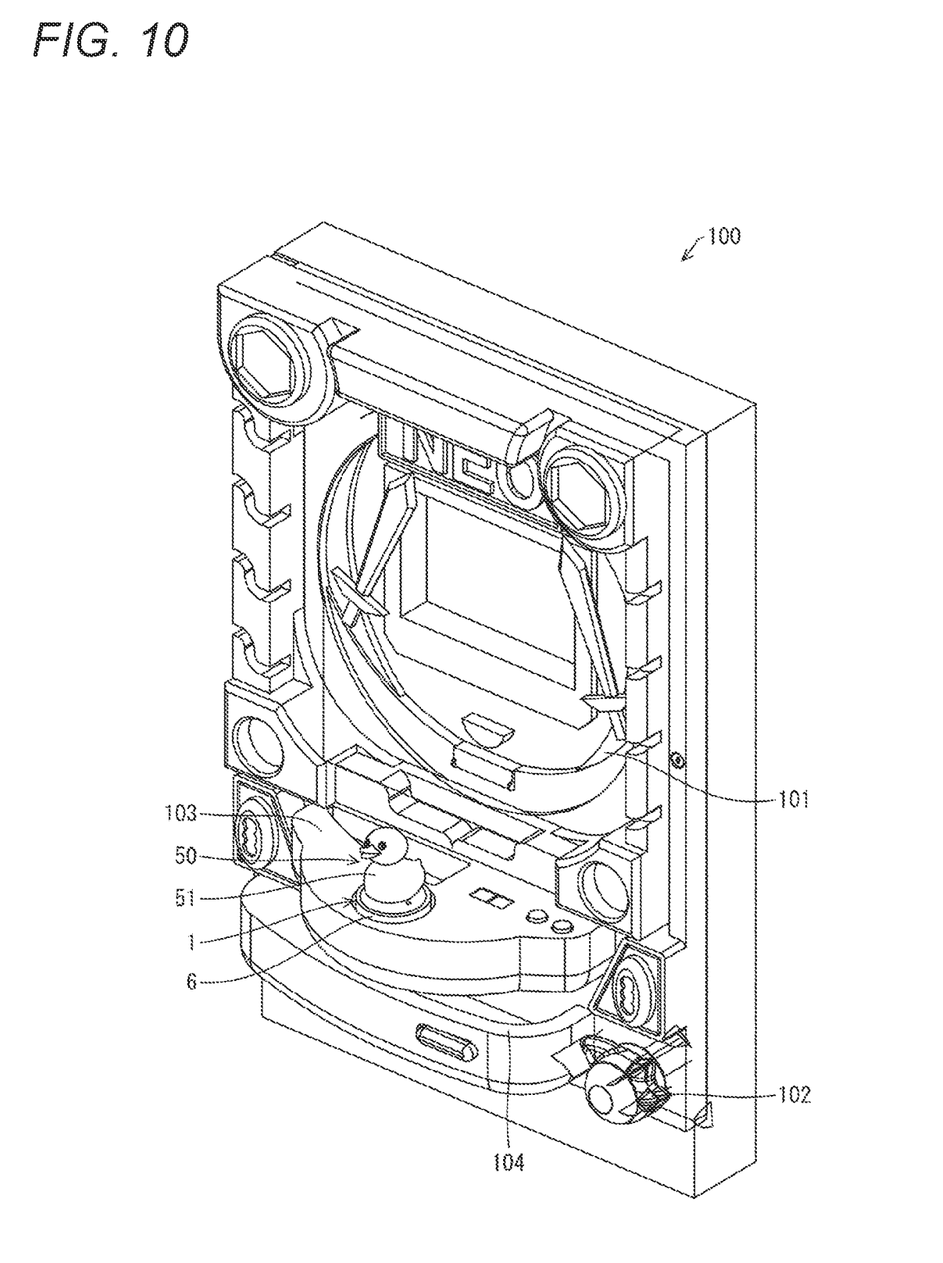
FIG. 10 is a diagram illustrating a perspective view illustrating an exemplary game machine equipped with a gimmick device according to one or more embodiments.

First, a description will be given of an exemplary scene to which one or more embodiments is applied. FIG. 10 is a perspective view of a configuration of a game machine 100 equipped with a gimmick device 50 according to the embodiment. FIG. 10 illustrates an application example of the gimmick device 50. The game machine 100 may include, but not limited to, pachinko, pachinko-slot, and pachinko gaming machines.

As illustrated in FIG. 10, the game machine 100 includes a game area 101, a handle 102, an upper ball tray 103, a lower ball tray 104, and the like. The game area 101 is an area within which a game ball (a game medium) launched by the handle 102 moves. The handle 102 is a device for launching a game ball. A user turns the handle 102, and keeps the handle 102 turned, thereby launching game balls one after another toward the game area 101.

The upper ball tray 103 stores therein a game ball gained during play or a game ball lent out to the user through a ball lending operation. The lower ball tray 104 stores therein a game ball falling out of the upper ball tray 103. Specifically, when a game ball enters a prize-winning port (not illustrated) in the game area 101, a ball dispenser (not illustrated) installed on the back side of the game machine 100 dispenses game balls, the number of which is set in accordance with the prize-winning port, to the upper ball tray 103 or the lower ball tray 104.

Figure 9:
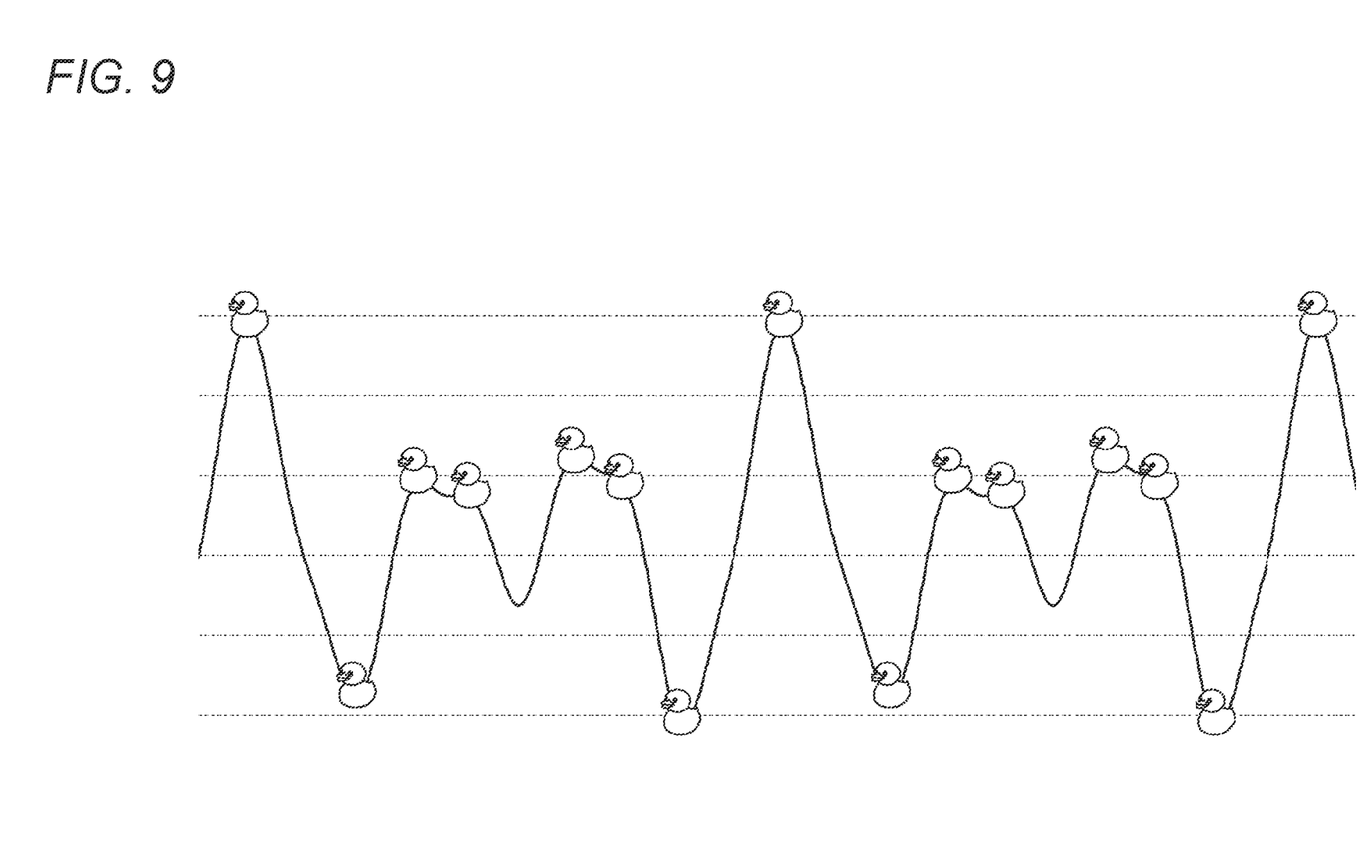
FIG. 9 is a diagram illustrating an image of movement of a gimmick based on the displacement of a movable part in a gimmick device according to one or more embodiments.

A voice coil motor (hereinafter, abbreviated as VCM) 1 is a drive mechanism for the gimmick device 50. The VCM 1 uses a component of a VCM main body for a displacement sensor including a differential transformer, thereby detecting a displacement without enlargement of its outer shape and increase in cost. The VCM 1 achieves the gimmick device 50 configured to perform a floating operation that causes a gimmick 51 mounted to a movable part 20 to smoothly move up and down as if floating on the surface of water as illustrated in FIG. 9, without a large installation space and considerable increase in cost.

2. Configuration Example

With reference to FIGS. 1 to 9, next, a description will be given of an embodiment according to one or more embodiments.

(Configuration of VCM 1)

Figure 1:
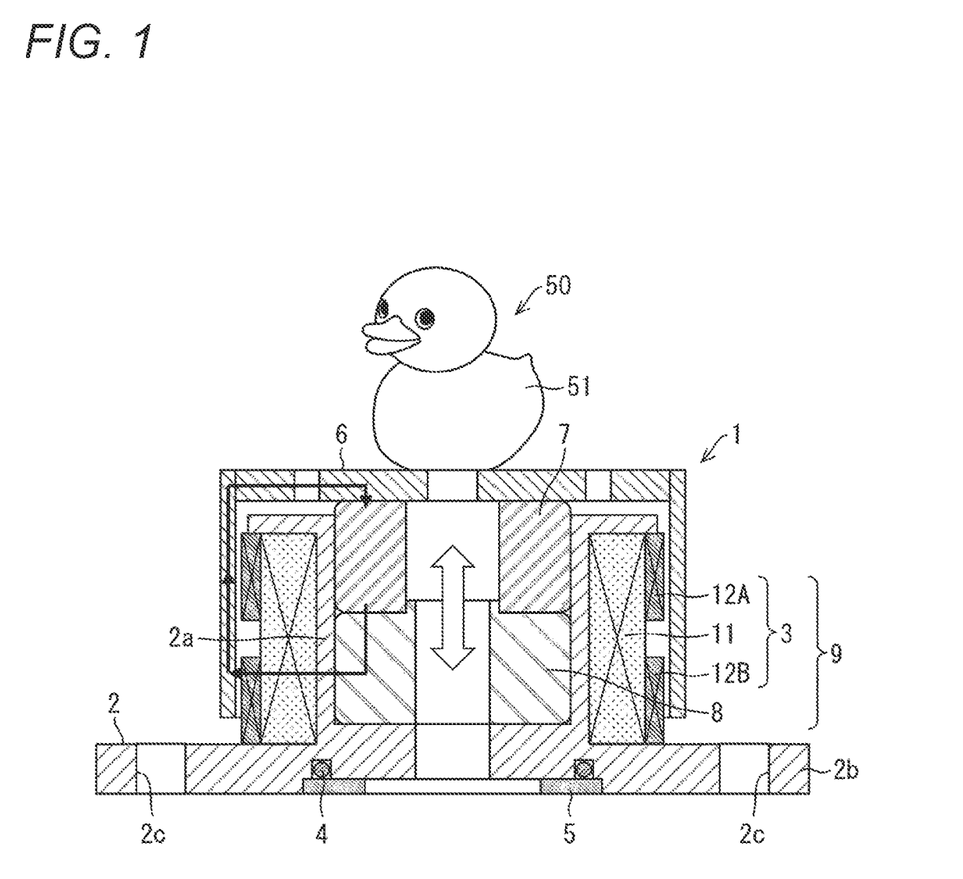
FIG. 1 is a diagram illustrating a partial longitudinal sectional view of a gimmick device according to one or more embodiments.
Figure 2:
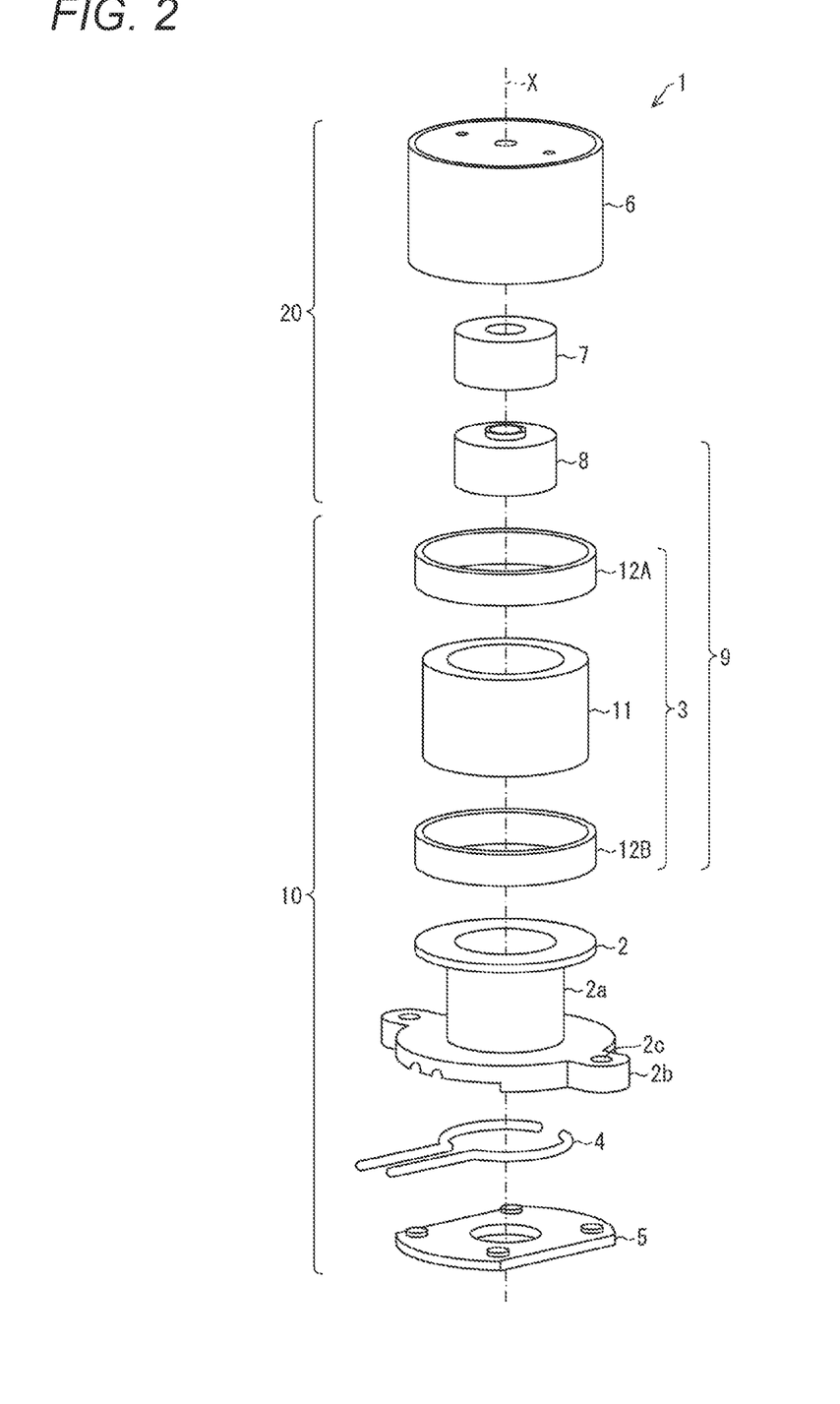
FIG. 2 is a diagram illustrating an exploded perspective view of a VCM of a gimmick device according to one or more embodiments.

FIG. 1 is a partial longitudinal sectional view of the gimmick device 50 according to one or more embodiments. FIG. 2 is an exploded perspective view of the VCM 1 of the gimmick device 50 according to one or more embodiments. As illustrated in FIGS. 1 and 2, the VCM 1 includes a bobbin 2, a coil part 3, a lead wire 4, a back cover 5, a casing 6, a permanent magnet 7, and a yoke and iron-core 8.

The bobbin 2 is a bottom end-closed tubular component around which the coil part 3 is wound. The bobbin 2 is typically made of a resin. The coil part 3 includes a drive and primary coil 11 and two secondary coils 12A and 12B. The coil part 3 is wound around a cylindrical portion 2a of the bobbin 2.

The drive and primary coil 11 serves as a drive coil of the VCM main body to drive the movable part 20 including the permanent magnet 7. The drive and primary coil 11 also serves as a primary coil for exciting a displacement sensor 9 including a differential transformer that detects a position of the movable part 20. The secondary coils 12A and 12B serve as two secondary coils for detecting the displacement sensor 9. As will be described in detail later, the displacement sensor 9 includes the drive and primary coil 11, the two secondary coils 12A and 12B, and the yoke and iron-core 8.

In one or more embodiments, the drive and primary coil 11 is wound around the cylindrical portion 2a, and the two secondary coils 12A and 12B are wound around an outer periphery of the drive and primary coil 11 while being placed on top of the other. The two secondary coils 12A and 12B are arranged side by side in an axial direction. The axial direction refers to a direction of a center axis X of the coil part 3 (see FIG. 2) extending upward and downward (in an up-and-down direction). In the following description, the secondary coil 12A that is located above the secondary coil 12B is referred to as an upper secondary coil 12A, and the secondary coil 12B that is located below the secondary coil 12A is referred to as a lower secondary coil 12B.

The drive and primary coil 11, upper secondary coil 12A, and lower secondary coil 12B of the coil part 3 are soldered to the lead wire 4 at a back side of a bottom portion 2b of the bobbin 2. Each of the drive and primary coil 11, the upper secondary coil 12A, and the lower secondary coil 12B is connected to an external device via the lead wire 4. It should be noted that FIG. 2 illustrates two lead wires 4. The back cover 5 is disposed on the back side of the bottom portion 2b to protect the soldered portion. The bottom portion 2b extends in a flange shape, and has a mount hole 2c bored in the flange portion. The VCM 1 is fastened to, for example, a housing with a screw (not illustrated) inserted into the mount hole 2c. In the embodiment, a side including the drive and primary coil 11 is fixed, and the bobbin 2, the coil part 3, the lead wire 4, and the back cover 5 correspond to a fixed part 10.

The casing 6 has a bottom end-closed cylindrical shape, and has a central bottom portion located therein. The permanent magnet 7 having a cylindrical outer peripheral face is disposed on the central bottom portion. The permanent magnet 7 is fixed by adsorption or adhesion to the casing 6.

The yoke and iron-core 8 is disposed opposite the permanent magnet 7 in the casing 6. The yoke and iron-core 8 is fixed by adsorption or adhesion to the permanent magnet 7. The yoke and iron-core 8 is equal in diameter to the permanent magnet 7. The yoke and iron-core 8 serves as a yoke of the VCM main body, and also serves as an iron core of the displacement sensor 9. Each of the casing 6 and the yoke and iron-core 8 is typically made of iron.

In the embodiment, each of the permanent magnet 7 and the yoke and iron-core 8 has a ring shape. The permanent magnet 7 and the yoke and iron-core 8 may alternatively have columnar shapes that are equal in diameter to each other. The casing 6, the permanent magnet 7, and the yoke and iron-core 8 correspond to the movable part 20.

The permanent magnet 7 is located at a central portion of the movable part 20 as seen in plan view from the axial direction. The permanent magnet 7 has a magnetization direction that is parallel to the axial direction. The casing 6 and the yoke and iron-core 8 are arranged with the permanent magnet 7 interposed therebetween in the magnetization direction.

The permanent magnet 7 produces a magnetic flux. The magnetic flux passes an air gap G (magnetic gap) via the yoke and iron-core 8, and then returns to the permanent magnet 7 through the casing 6, as indicated by an arrow X in FIG. 1. The drive and primary coil 11 is disposed in the air gap G, and is interlinked with the magnetic flux produced by the permanent magnet 7.

(Operation of VCM 1)

Passing a current through the drive and primary coil 11 interlinked with the air gap G produces an electromagnetic force in a direction according to Fleming's left-hand rule. In the embodiment, since the drive and primary coil 11 is fixed, a side including the permanent magnet 7 acts as the movable part 20 by a reaction force to produce a thrust in the axial direction. On the contrary, the side including the permanent magnet 7 may be fixed, and the side including the drive and primary coil 11 may be made movable.

(Relationship Between Drive Current and Displacement of Movable Part 20)

Figure 3:
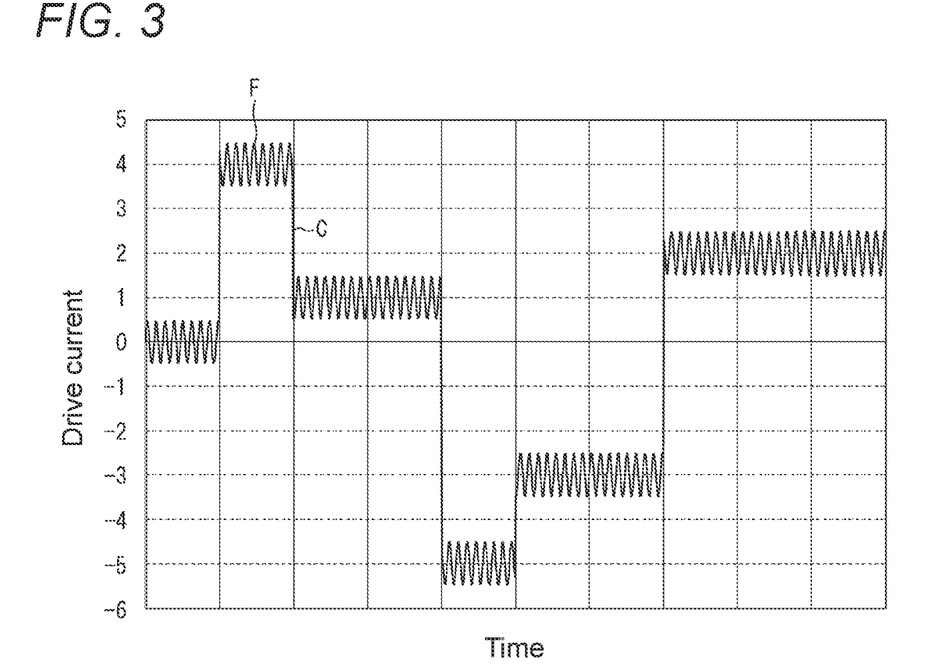
FIG. 3 is a waveform diagram illustrating an exemplary drive current flowing through a drive and primary coil of a VCM of a gimmick device according to one or more embodiments.
Figure 4:
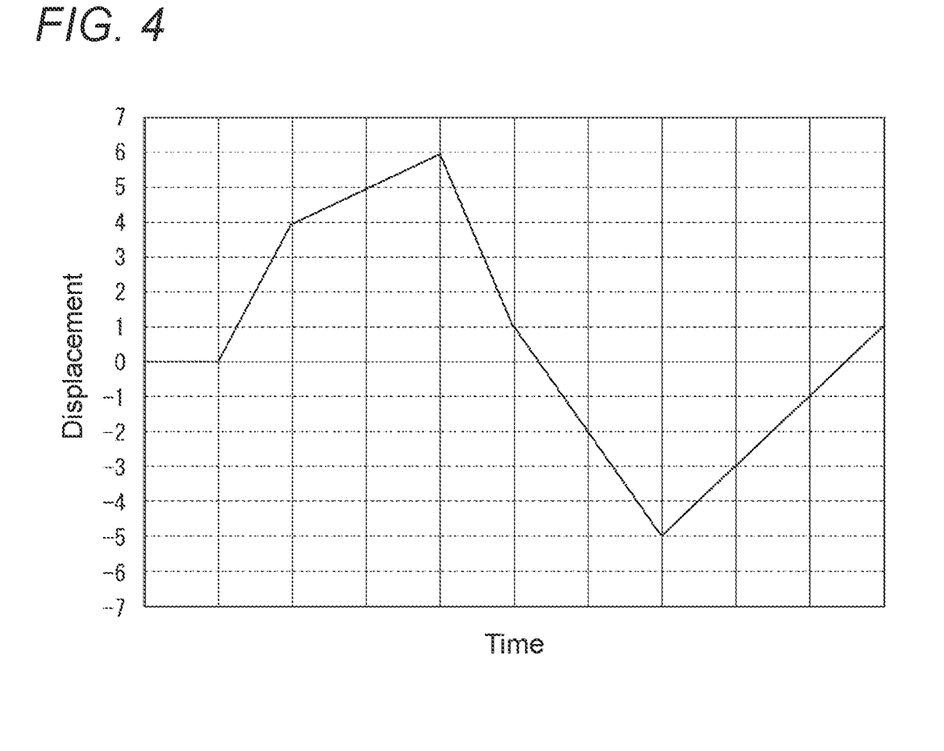
FIG. 4 is a graph illustrating an exemplary displacement of a VCM in which a drive current, such as is illustrated in FIG. 3, flows through a drive and primary coil.

FIG. 3 is a waveform diagram illustrating an exemplary drive current flowing through the drive and primary coil 11 of the VCM 1 of the gimmick device 50 according to the embodiment. FIG. 4 is a graph illustrating an exemplary displacement of the VCM 1 (specifically, a displacement of the movable part 20) in a state in which the drive current illustrated in FIG. 3 flows through the drive and primary coil 11.

As illustrated in FIG. 3, a drive current C with a normal rectangular wave for moving the movable part 20 up and down is fed to the drive and primary coil 11, with a high-frequency current F for displacement detection superimposed thereon. In FIG. 3, the vertical axis represents a numeral value that is a current value (an addition current value) to be added to a direct current P for lifting the movable part 20 up from a lower position at which the drive current is zero (see 502 in FIG. 5 to be described later) to a central position (see 500 in FIG. 5). The central position corresponds to a reference position of the displacement of the movable part 20.

As illustrated in FIG. 4, the movable part 20 is held in a position at which its displacement is zero in the state in which the addition current value is zero. When the addition current value is positive, the drive current is larger than the direct current P; therefore, the movable part 20 moves upward from the present position. When the addition current value is negative, the drive current is smaller than the direct current P or flows reversely; therefore, the movable part 20 moves downward from the present position. The movable part 20 has an acceleration upon movement which is proportional to an absolute value of the addition current value. The acceleration increases as the addition current value is larger.

(Displacement Sensor 9)

As illustrated in FIGS. 1 and 2, the displacement sensor 9 configured to detect a position of the movable part 20 includes the drive and primary coil 11, the upper secondary coil 12A, the lower secondary coil 12B, and the yoke and iron-core 8. In the displacement sensor 9, the drive and primary coil 11 and the yoke and iron-core 8 serve as the constituent components of the VCM main body. In other words, the drive and primary coil 11 and the yoke and iron-core 8 are used for both the displacement sensor 9 and the VCM main body. The displacement sensor 9 is equal in operating principle to a differential transformer.

Figure 5:
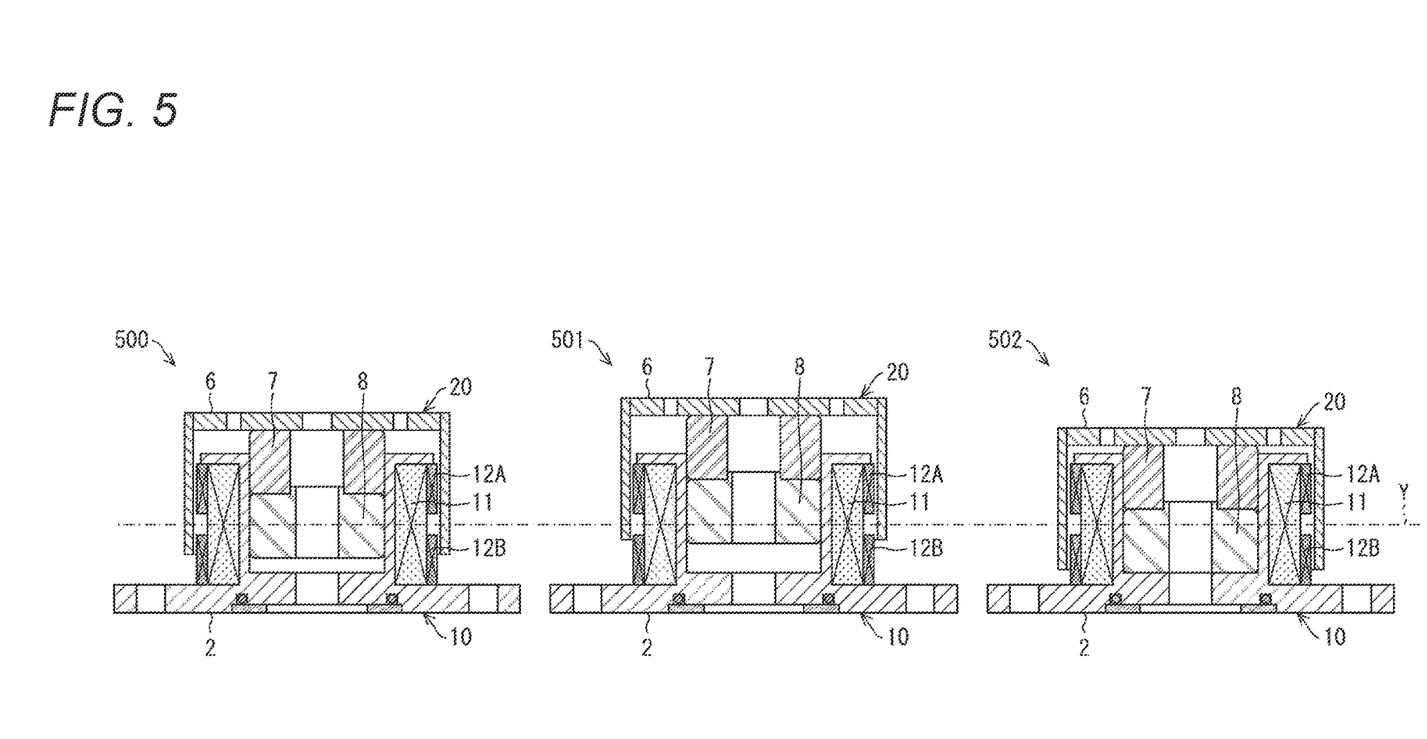
FIG. 5 is a diagram illustrating an operating principle of a displacement sensor in a VCM of a gimmick device according to one or more embodiments.

With reference to FIG. 5, a description will be given of the operating principle of the displacement sensor 9. FIG. 5 is a diagram illustrating an operating principle of the displacement sensor 9 in the VCM 1 of the gimmick device 50 according to the embodiment. In FIG. 5, a state 500 indicates that the movable part 20 is at the central position, a state 501 indicates that the movable part 20 is at an upper position displaced from the central position, and a state 502 indicates that the movable part 20 is at a lower position displaced from the central position. The central position corresponds to the position at which the addition current value is zero in FIG. 3, and also corresponds to the reference position at which the displacement is zero in FIG. 4.

The drive and primary coil 11 fed with the high-frequency current F superimposed on the drive current C excites a magnetic flux that passes through the yoke and iron-core 8 and then returns to the drive and primary coil 11. The magnetic flux induces voltages in the upper secondary coil 12A and the lower secondary coil 12B. The voltage induced in the upper secondary coil 12A and the voltage induced in the lower secondary coil 12B differ depending on the position of the yoke and iron-core 8.

Specifically, a mutual inductance of each of the upper secondary coil 12A and the lower secondary coil 12B relative to the drive and primary coil 11 changes with a change in relative position between the yoke and iron-core 8 and the coil part 3. In the state 500, the movable part 20 is at the central position, and the yoke and iron-core 8 is in the middle of the coil part 3 in the up-and-down direction. In FIG. 5, a chain line Y indicates the middle of the coil part 3 in the up-and-down direction. In the state 500, the mutual inductance of the upper secondary coil 12A relative to the drive and primary coil 11 is equal to the mutual inductance of the lower secondary coil 12B relative to the drive and primary coil 11. Therefore, the output voltage at the upper secondary coil 12A and the output voltage at the lower secondary coil 12B become equal to each other, so that a difference therebetween becomes zero.

In the state 501, the movable part 20 is at the upper position, and the yoke and iron-core 8 is relatively located upward with respect to the middle of the coil part 3 in the up-and-down direction. In the state 501, the mutual inductance of the upper secondary coil 12A relative to the drive and primary coil 11 increases while the mutual inductance of the lower secondary coil 12B relative to the drive and primary coil 11 decreases. A voltage is therefore generated between the upper secondary coil 12A and the lower secondary coil 12B in accordance with a difference between the induced voltage in the upper secondary coil 12A and the induced voltage in the lower secondary coil 12B.

In the state 502, the movable part 20 is at the lower position, and the yoke and iron-core 8 is located relatively downward with respect to the middle of the coil part 3 in the up-and-down direction. In the state 502, the mutual inductance of the upper secondary coil 12A relative to the drive and primary coil 11 decreases while the mutual inductance of the lower secondary coil 12B relative to the drive and primary coil 11 increases. A voltage is therefore generated between the upper secondary coil 12A and the lower secondary coil 12B in accordance with a difference between the induced voltage in the upper secondary coil 12A and the induced voltage in the lower secondary coil 12B. The polarity of the voltage relative to the difference is reversed in the state in which the movable part 20 is at the upper position and in the state in which the movable part 20 is at the lower position.

As described above, there is a difference in induced voltage between the upper secondary coil 12A and the lower secondary coil 12B in accordance with a position of the movable part 20. A voltage signal indicating a displacement of the movable part 20 (hereinafter, referred to as a displacement signal) is therefore obtained from signals output from the upper secondary coil 12A and lower secondary coil 12B.

Figure 6:
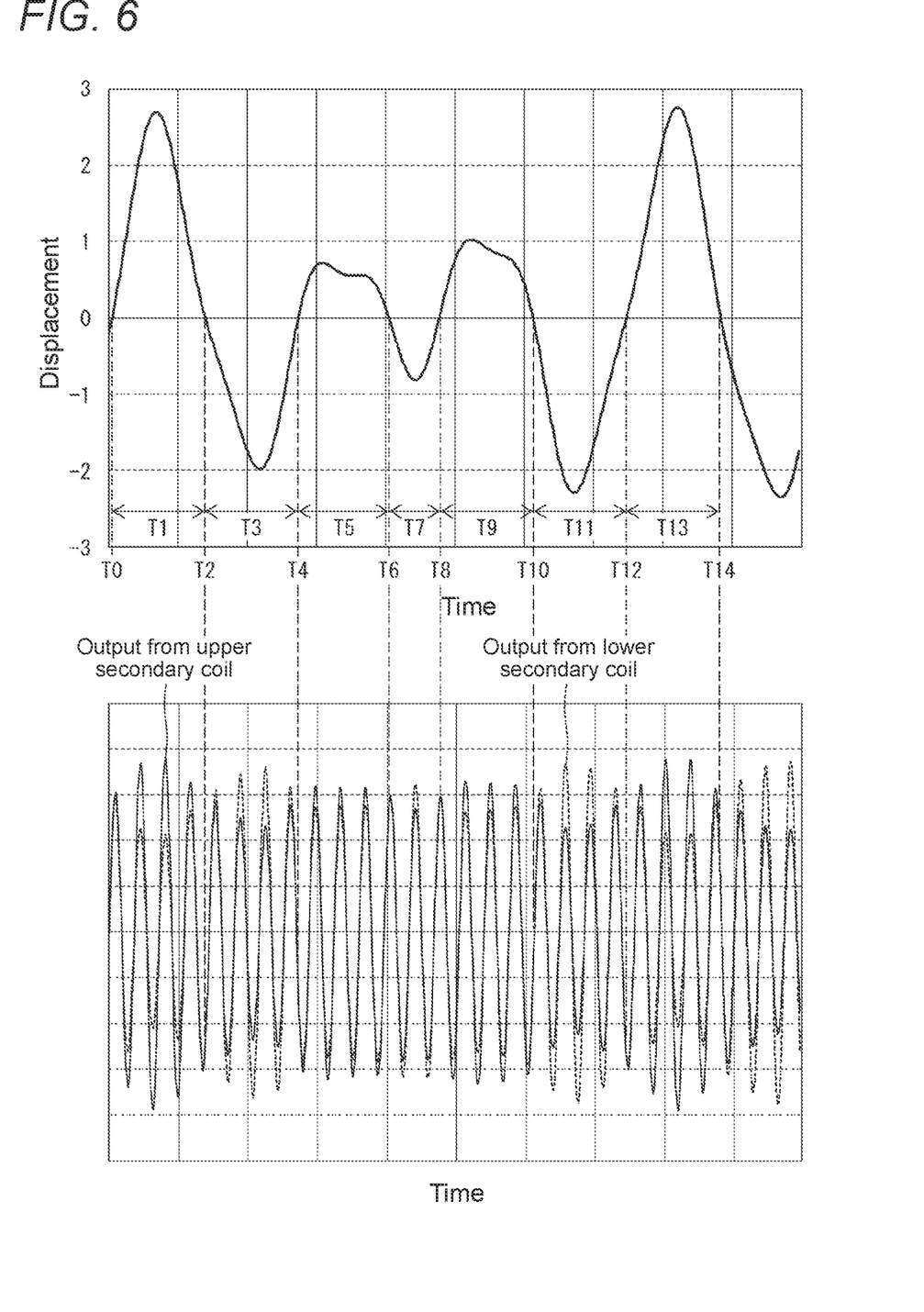
FIG. 6 is a diagram illustrating an exemplary displacement of a movable part and an exemplary voltage signal to be induced in each of an upper secondary coil and a lower secondary coil due to the displacement, in a VCM of a gimmick device according to one or more embodiments.

FIG. 6 is a diagram illustrating an exemplary displacement of the movable part 20 and an exemplary voltage signal to be induced in each of the upper secondary coil 12A and the lower secondary coil 12B due to the displacement, in the VCM 1 of the gimmick device 50 according to the embodiment. As illustrated in FIG. 6, during times T0, T2, T4, T6, T8, T10, T12, and T14 when the movable part 20 is at the central position and a displacement thereof is zero, an output voltage from (an amplitude in) the upper secondary coil 12A is equal to an output voltage from (an amplitude in) the lower secondary coil 12B.

During times (periods) T1, T5, T9, and T13 when the movable part 20 is displaced higher than the central position, the output voltage from (the amplitude in) the upper secondary coil 12A increases while the output voltage from (the amplitude in) the lower secondary coil 12B decreases.

During times (periods) T3, T7, and T11 when the movable part 20 is displaced lower than the central position, the output voltage from (the amplitude in) the lower secondary coil 12B increases while the output voltage from (the amplitude in) the upper secondary coil 12A decreases.

(Control Blocks of VCM 1)

Figure 7:
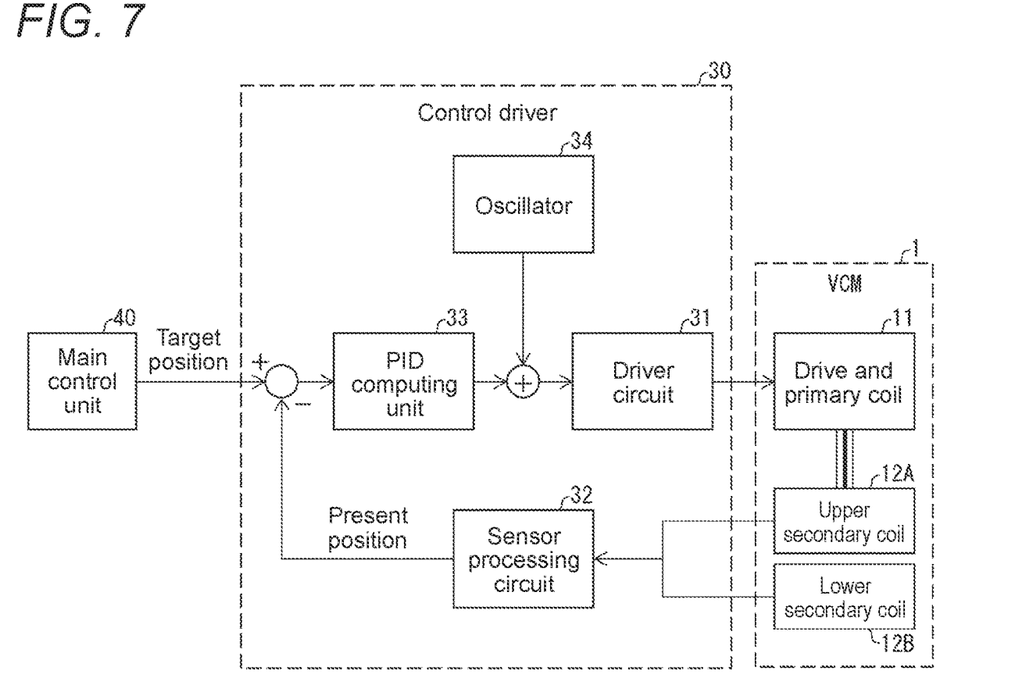
FIG. 7 is a control block diagram illustrating a VCM and a control driver in a gimmick device according to one or more embodiments.

FIG. 7 is a control block diagram illustrating the VCM 1 and a control driver 30 in the gimmick device 50 according to the embodiment. The control driver 30 is a drive control device configured to drive the VCM 1. The control driver 30 receives a target position of the movable part 20 from the main control unit 40. The control driver 30 drives the VCM 1 to move the movable part 20 to the target position. The main control unit 40 is, for example, a control device for stage effects, installed in the game machine 100.

The control driver 30 includes a driver circuit (a drive unit) 31, a sensor processing circuit (a processing unit) 32, a proportional integral derivative (PID) computing unit (a correction unit) 33, and an oscillator 34.

The oscillator 34 generates a high-frequency current F for displacement detection. The driver circuit 31 amplifies a signal that includes a signal received from the main control unit 40, the signal indicating the target position of the movable part (the movable side) 20 in the VCM 1, and a high-frequency current superimposed on the signal, the high-frequency current being generated by the oscillator 34, and supplies the signal thus amplified to the drive and primary coil 11. The drive current C is obtained by amplifying the signal indicating the target position, and the high-frequency current F is superimposed on the drive current C (see FIG. 3).

The sensor processing circuit 32 receives voltage signals output from the upper secondary coil 12A and lower secondary coil 12B in the VCM 1. The sensor processing circuit 32 outputs a present position signal indicating a present position proportional to the displacement of the movable part 20, based on the voltage signals received from the upper secondary coil 12A and lower secondary coil 12B. In other words, the sensor processing circuit 32 outputs a position signal indicating a position of the movable part 20, based on the voltage signals received from the upper secondary coil 12A and lower secondary coil 12B.

The PID computing unit 33 corrects a signal indicating a target position to be input to the driver circuit 31, based on a position signal output from the sensor processing circuit 32. The PID computing unit 33 receives a difference between a target position transmitted from the main control unit 40 and a present position indicated by a present position signal. The PID computing unit 33 subjects the difference between the target position and the present position to proportional integral derivative computation to output a signal indicating a result of the computation for moving the movable part 20 to the target position (a signal indicating the corrected target position). The PID computing unit 33 sends the signal indicating the result of the computation to the driver circuit 31 in a state in which the high-frequency current F generated by the oscillator 34 is superimposed on the signal.

The driver circuit 31 receives the signal indicating the result of the computation to which the high-frequency current F is added, from the PID computing unit 33, subjects the signal to power amplification to generate a drive current on which the high-frequency current F is superimposed, and supplies the drive current to the drive and primary coil 11 of the VCM 1. The movable part 20 is thus accurately moved to the target position.

It may be preferable that the high-frequency current F generated by the oscillator 34 has a frequency higher than a response frequency of the VCM 1. A higher frequency enables highly accurate position control since the superimposed high-frequency current F causes no displacement of the VCM 1.

(Advantageous Effects of VCM 1)

According to the configuration described above, the drive and primary coil 11 serves as the drive coil of the VCM 1, and also serves as the primary coil of the displacement sensor 9 including the differential transformer, and the high-frequency current F for detecting a position of the movable part 20 is superimposed on the drive current C. In addition, the yoke and iron-core 8 serves as the yoke movable integrally with the permanent magnet 7 of the VCM 1, and also serves as the iron core of the displacement sensor 9. With the above-described configuration, the VCM 1 that includes the displacement sensor 9 incorporated therein is capable of outputting a signal indicating a position of the movable part 20, by addition of the upper secondary coil 12A and the lower secondary coil 12B, which enables position feedback control.

Since the displacement sensor 9 includes a component of a VCM, reductions in outer shape and cost are achieved as compared with a case where a separate component such as a displacement detector or a capacitive sensor is externally provided.

Each of the upper secondary coil 12A and the lower secondary coil 12B for detection includes the magnet wire wound around the bobbin around which the drive and primary coil 11 is also wound. The above-described configuration enables an integrated structure with the VCM main body unlike a configuration in which a scale or the like is fastened with screws and therefore causes no mount error that may be caused in a configuration in which a displacement detector, a capacitive sensor, or the like is externally mounted to a VCM main body. The above-described configuration thus achieves higher detection accuracy. In addition, the above-described configuration essentially causes no error factors such as a positional deviation owing to a secular change.

According to the foregoing configuration, the upper secondary coil 12A and the lower secondary coil 12B are wound around the outer periphery of the drive and primary coil 11 while being placed on top of the other. With the above-described configuration, the displacement sensor 9 is incorporated in the VCM 1 without changing the axial size of the outer shape of the VCM 1.

Alternatively, the two secondary coils 12A and 12B may be wound around two axial ends of the drive and primary coil 11. With the above-described configuration, the displacement sensor 9 is incorporated in the VCM 1 without changing the radial size of the outer shape of the VCM 1.

(Gimmick Device Including VCM 1)

Figure 8:
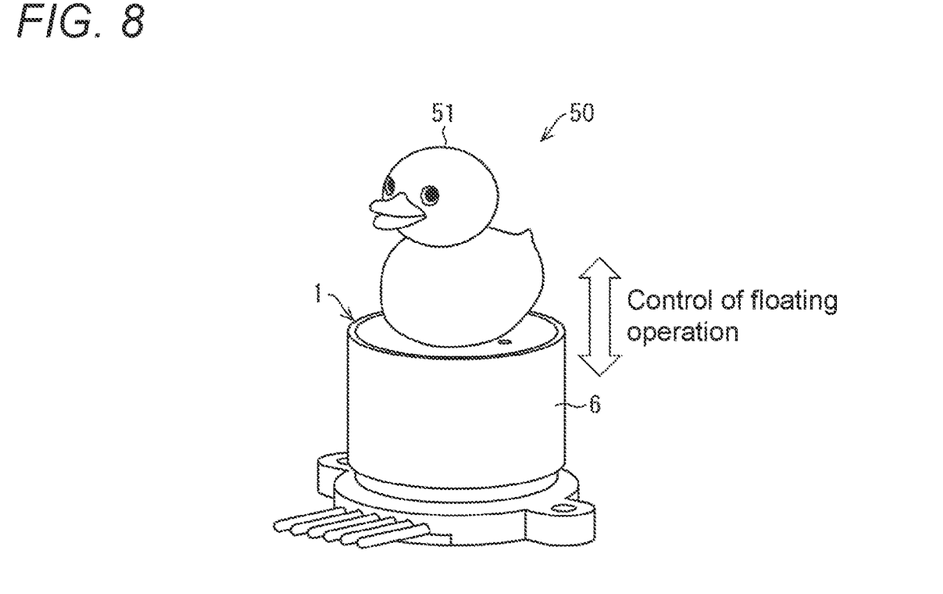
FIG. 8 is a diagram illustrating a perspective view of a gimmick device according to one or more embodiments.

FIG. 8 is a perspective view of the gimmick device 50 according to the embodiment. The gimmick 51 in the form of a duck is mounted on an upper surface of the casing 6 of the movable part 20. FIG. 9 is a diagram illustrating an image of movement of the gimmick 51 based on the displacement of the movable part 20 in the gimmick device 50.

The VCM 1 outputs a signal indicating a position of the movable part 20. The control driver 30 is therefore capable of position feedback control using the signal. As a result, the movable part 20, that is, the gimmick 51 is accurately moved to a target position even when a load weight varies due to variations in weight of the members (the gimmick 51, the casing 6, the permanent magnet 7, and the yoke and iron-core 8) in the movable side.

Likewise, the movable part 20, that is, the gimmick 51 is accurately moved to a target position even when the temperature of the permanent magnet 7 rises due to, for example, a change in ambient temperature or self heat generation of the drive and primary coil 11 owing to energization, resulting in decrease of magnetic force.

The accurate movement of the gimmick 51 to the target position enables, for example, a floating operation of the gimmick 51 smoothly moving up and down as if floating on the surface of water as illustrated in FIG. 9.

(Implementable Example Using Software)

The control blocks of the control driver 30 may be implementable using a logic circuit (hardware) including, for example, an integrated circuit (an IC chip) or may be implementable using software.

In the latter case, the control driver 30 includes a computer for executing commands of a program as the software implementing the respective functions. The computer includes, for example, one or more processors and a computer-readable recording medium storing therein the program. In the computer, the processor reads the program from the recording medium, and executes the program. One or more embodiments is thus achieved. Examples of the processor may include, but not limited to, a central processing unit (CPU). Examples of the recording medium may include, but not limited to, a tape, a disk, a card, a semi-conductor memory, and a programmable logic circuit, in addition to a non-transitory tangible medium such as a read only memory (ROM). The computer may further include, for example, a random access memory (RAM) that develops the program. The program may be supplied to the computer via any transmission medium (e.g., a communication network, a broadcast wave) capable of transmitting the program. One or more embodiments may be implemented in the form of a data signal embedded in a carrier wave, as the program embodied by electronic transmission.

One or more embodiments may not be limited to each of the foregoing embodiments. Various changes may be made without departing from the scope presently or hereafter claimed. An embodiment obtained by appropriately combining technical features disclosed respectively in different embodiments is also embraced in the technical scope.

The invention claimed is:

1. A gimmick device comprising:
   a gimmick; and
   a voice coil motor configured to operate the gimmick, wherein
   the voice coil motor comprises:
      a casing having a bottom end-closed cylindrical shape;
      a permanent magnet having a cylindrical outer peripheral face, the permanent magnet being disposed on a central bottom portion in the casing;
      a yoke disposed opposite the permanent magnet in the casing, the yoke being equal in diameter to the permanent magnet;
      a bobbin; and
      a coil part wound around the bobbin,
      the gimmick is mounted to a movable one of the casing or the bobbin, the coil part comprises:
      a drive and primary coil serving as a drive coil and a primary coil of a differential transformer, the drive and primary coil being interlinked with a magnetic flux by the permanent magnet; and
      two secondary coils of the differential transformer, and
      the yoke is disposed in a central space defined in the coil part, and serves as an iron core of the differential transformer.

2. The gimmick device according to claim 1, wherein the two secondary coils are wound around an outer periphery of the drive and primary coil while being placed on top of the other.

3. The gimmick device according to claim 1, wherein the two secondary coils are wound around axial two ends of the drive and primary coil.

4. A drive control device for the gimmick device according to claim 1, the drive control device comprising:
   an oscillator configured to generate a high-frequency current;
   a drive unit configured to amplify a signal that comprises a signal indicating a target position of a movable side in the voice coil motor and the high-frequency current superimposed on the signal, the high-frequency current being generated by the oscillator, and to supply the amplified signal to the drive and primary coil;
   a processing unit configured to receive voltages to be induced in the two secondary coils of the voice coil motor, and to output a position signal indicating a position of the movable side, based on each of the voltages; and
   a correction unit configured to correct a signal indicating the target position, the signal being input to the drive unit, based on the position signal output from the processing unit.

5. The drive control device according to claim 4, wherein the high-frequency current has a frequency higher than a response frequency of the voice coil motor.

6. A game machine comprising:
   the gimmick device according to claim 1; and
   the drive control device according to claim 4.

7. A drive control device for the gimmick device according to claim 2, the drive control device comprising:
   an oscillator configured to generate a high-frequency current;
   a drive unit configured to amplify a signal that comprises a signal indicating a target position of a movable side in the voice coil motor and the high-frequency current superimposed on the signal, the high-frequency current being generated by the oscillator, and to supply the amplified signal to the drive and primary coil;
   a processing unit configured to receive voltages to be induced in the two secondary coils of the voice coil motor, and to output a position signal indicating a position of the movable side, based on each of the voltages; and
   a correction unit configured to correct a signal indicating the target position, the signal being input to the drive unit, based on the position signal output from the processing unit.

8. A drive control device for the gimmick device according to claim 3, the drive control device comprising:
   an oscillator configured to generate a high-frequency current;
   a drive unit configured to amplify a signal that comprises a signal indicating a target position of a movable side in the voice coil motor and the high-frequency current superimposed on the signal, the high-frequency current being generated by the oscillator, and to supply the amplified signal to the drive and primary coil;
   a processing unit configured to receive voltages to be induced in the two secondary coils of the voice coil motor, and to output a position signal indicating a position of the movable side, based on each of the voltages; and
   a correction unit configured to correct a signal indicating the target position, the signal being input to the drive unit, based on the position signal output from the processing unit.

9. The drive control device according to claim 7, wherein the high-frequency current has a frequency higher than a response frequency of the voice coil motor.

10. The drive control device according to claim 8, wherein the high-frequency current has a frequency higher than a response frequency of the voice coil motor.

11. A game machine comprising:
    the gimmick device according to claim 1; and
    the drive control device according to claim 5.

12. A game machine comprising:
    the gimmick device according to claim 2; and
    the drive control device according to claim 4.

13. A game machine comprising:
    the gimmick device according to claim 2; and
    the drive control device according to claim 5.

14. A game machine comprising:
    the gimmick device according to claim 3; and
    the drive control device according to claim 4.

15. A game machine comprising:
    the gimmick device according to claim 3; and
    the drive control device according to claim 5.

* * * * *